3,168,508
PROCESS FOR POLYMERIZATION OF BUTADIENE IN AQUEOUS MEDIA
Alfred J. Canale, Orinda, Calif., assignor to Shell Oil Company, New York, N.Y., a corporation of Delaware
No Drawing. Filed Aug. 21, 1962, Ser. No. 218,430
6 Claims. (Cl. 260—94.3)

This invention relates to the polymerization of butadiene. More particularly, it relates to the stereo specific polymerization of butadiene at accelerated rates.

Certain conjugated dienes and other vinyl monomers may be polymerized to produce stereospecific addition products. Such polymerizations can be conducted in contact with catalysts that are referred to in the art as Ziegler or low pressure catalysts. Another class being used for producing stereospecific polymers are the lithium based catalysts. Representative of the Ziegler catalysts, are the reaction products of a transition metal halide and an organo metallic compound such as an aluminum alkyl halide. The lithium based catalysts are represented for example by lithium butyl or a mixture of lithium butyl and lithium metal.

These catalysts are always employed in the presence of inert hydrocarbon solvents and in the virtual absence of water, oxygen and other polar contaminants. The prior art technique, while being highly suitable for the product of useful products, has several disadvantages which are mainly attributable to the requirement that a hydrocarbon solvent be employed as the medium in the virtual absence of water. These disadvantages are normally concerned with the concentration limitation imposed on the system. For example, the presence of more than a few percent of polymer in hydrocarbon solution produces a cement which is so high in viscosity as to be substantially impractical for further commercial treatment. Secondly, the use of solvent systems requires that the solvent be completely removed. While it is possible to remove the large bulk of the solvent without difficulty, it is extremely difficult in practice to remove the last traces of solvent without extensive processing steps or without damage to the polymeric products.

The avoidance of solvent polymerization systems has been found possible by the use of certain aqueous systems containing water-soluble catalysts which are preferably certain transition metal compounds. While the high degree of control over stereospecificity of the system is possible by such means, when utilizing the proper selection of metallic salts or derivatives thereof, the rate and extent of polymerization has been far from satisfactory. The systems heretofore employed showed either extremely slow rates of polymerization or a relatively low degree of polymer formation usually accompanied by an unsuitably low average molecular weight of the resulting polymer.

Now, in accordance with the present invention, it has been found possible to polymerize conjugated dienes which include at least 50 mol percent of butadiene in aqueous environments which are preferably relatively free of oxygen by utilizing the combination of a catalyst of the group consisting of ruthenium salts of mineral acids or their complex with diene hydrocarbons, tri-hydrocarbyl phosphines, trihydrocarbyl arsines and trihydrocarbyl stibines, as well as mixtures thereof, in conjunction with hypophosphorous acid. The utilization of hypophosphorous acid in conjunction with the ruthenium catalyst specified herewith results in an unexpected and substantial increase in the rate and extent of polymerization especially when the reaction is carried out at a temperature between about 0 and 150° C. Furthermore, it is preferred that the polymerization be carried out in the presence of an emulsifying agent which is most conveniently an ionic emulsifying agent such as those specified hereinafter.

While it is not necessarily essential, it appears to be desirable to have the aqueous media employed in the polymerization system essentially free of dissolved oxygen. By "essentially free" is meant that the medium contains less than about 100 parts oxygen per million parts of water. Oxygen may be removed in any desired manner and it is most easily accomplished by boiling the water prior to injection into the polymerization vessel. Additionally it is advantageous for purposes of quality control to pass the water through a column packed with ion exchange resins to deionize the system, but this depends largely on the character of the water which is available.

The polymerization may be conducted at temperatures ranging from about 0° C. to about 150° C., preferably between about 25 and 75° C. The molecular weight of the product can be controlled to a certain degree by regulating the polymerization temperature, the average molecular weight usually increasing at lower temperatures. Elevated pressures may be employed if desired, particularly if the elevated pressure is obtained by either increasing the partial pressure of the monomeric diene hydrocarbon or by injection of hydrogen in the system, which may have beneficial effects upon the rate and extent of polymerization. In general, the process is usually conducted at about autogenic temperatures but pressures as high as about 1000 p.s.i.g. or more may be employed.

The catalyst used in the process of the invention is critical in that it must be selected to promote the type of stereospecificity desired when operating within the described aqueous system. The ruthenium chlorides are suitable, particularly those in the hydrate form. These may be used as such but preferably are in complex form with 1–20 mols of a diene hydrocarbon, preferably a cyclic diene hydrocarbon, or trihydrocarbyl phosphine, arsine, or stibine as well as mixtures of these species. The proportion of the diene hydrocarbon or phosphines, arsines or stibines is preferably between about 3 and 10 mols per mol of ruthenium in the complex. These complexes may be formed in situ or may be pre-formed, depending on the economics involved and the convenience of storing the complexes prior to their utilization in the polymerization process. Typical phosphines are the trialkyl phosphines, triaryl phosphines or mixed alkyl aryl phosphines. Alkyl radicals may be those having from 1 to 12 carbon atoms each and aryl radicals may have from 6 to 12 carbon atoms each. The following list of phosphines indicates the species which may be employed for this purpose, it being understood that the corresponding arsines and stibines may be used in place or in addition to these materials.

PHOSPHINES

Alkyl:
Tri(n-butyl)phosphine
Tri-secondary butyl phosphine
Tri-n-pentyl phosphine
Tri(isopropyl)phosphine
Tri(n-hexyl)phosphine Aryl:
Tri(phenyl)phosphine
Tri-benzyl phosphine
Di-phenyl ethyl phosphine
Di-naphthyl phenyl phosphine
Phenyl-di-secondary butyl phosphine Suitable diene hydrocarbons are typified especially by the cyclodienes such as cyclopentadiene, cyclohexadiene, norbornadiene and cyclooctadiene.

The process of the present invention relies upon the discovery that the presence of hypophosphorous acid substantially increases the rate and extent of polymerization while maintaining a high degree of stereospecificity of the product derived. The order of magnitude of improvement in rate is about 5–25 times that of the same catalyst system omitting the hypophosphorous acid.

The proportion of acid employed should be between about 0.01 and about 10 mols of hypophosphorous acid per mol of metallic catalyst, preferably between about 0.1 and 1 mol. The proportion of catalyst should be between about 0.01 and about 1 percent by weight based on the weight of the monomer being polymerized. The catalyst and/or acid may be injected into the polymerization system at one time or at programmed intervals. Since the acid and catalyst or their possible and potential reaction products are miscible with or soluble in the polymerization medium, surface effects such as contamination of a catalyst by polymer coatings are not encountered. These effects, if they are at all present are minimized by the further addition of a surface active agent, preferably an anionic surface active agent, which performs the function of better contact between the monomer and the aqueous polymerization medium, in effect acting as an emulsifying agent.

The agent is preferably present in an amount between about 1 and 5% by weight based on the aqueous phase. Anionic emulsifying agents are preferred, particularly those containing sulfur. These are exemplified by the following list of sulfonates and sulfates:

Sulfonated oils
Sulfated esters
Sulfated acids
Sulfated amids
Sulfated alcohols, e.g., sulfated dodecyl alcohol
Sulfated olefins, e.g., sulfated $C_{10-20}$ olefins
Petroleum sulfonates, e.g., green acid sulfonates
$C_{10-18}$ alkyl benzene sulfonates, e.g., dodecyl benzene sulfonates
Alkyl naphthalene sulfonates, e.g., amyl naphthalene sulfonates
Lignin sulfonates
Sulfated polymers
Sulfonated polymers, e.g., sulfonated $C_{12-21}$ polymers of lower olefins The process of the invention may be employed to polymerize conjugated dienes comprising at least about 25% by weight of butadiene and preferably at least about 50% by weight of butadiene. Optimum results are obtained when using butadiene as the sole conjugated diene for polymerization. Other dienes which may be present in addition to butadiene include isoprene, chloroprene, and other conjugated dienes particularly those having from 5 to 8 carbon atoms per molecule.

The pH of the polymerization system is preferably kept on the acid side and still more preferably is between about 1.5 and 6.0. Buffers such as alkali metal salts of low molecular weight fatty acids (e.g., sodium formate or sodium acetate may be present for the purpose of maintaining a desired pH level. HCl is used to control pH. This may result in the "in situ" formation of catalytic species such as $[RuCl_4]^=$, $[RuCl_5^=]$, $[RuCl_5^=]$, etc.

In conducting the polymerization according to the present invention, the several components may be brought together by any conventional means and in any order. It is preferred, although not necessarily essential, to take steps to minimize contamination of the system with oxygen as referred to hereinbefore.

The polymers prepared according to the process of the present invention may be utilized for any of the known industrial applications of synthetic rubbers such as in tires, belts, tubes, molded articles, films, tiles and the like. They may be modified with the usual rubber compounding ingredients such as vulcanizing agents and antioxidants. Furthermore, they may be combined with waxes, asphalts, tars and the like to form surfacing compositions for roads and walks as well as for airports and similar locations.

One of the peculiar features of this class of catalyst is the lack of sensitivity to the presence of oxidation inhibitors, such as diaryl amines and the like. In the usual free radical systems, the presence of such oxidation inhibitors virtually kills the polymerization reaction. With the present systems, comprising ruthenium compounds this has not been found to be true. This is indicated in the data contained in Table I below, forming a part of Example I.

*Example I—Ruthenium chloride-triphenyl phosphine catalyst: Effect of hypophosphorous acid*

A polymerization mixture was composed of .00035 mols of ruthenium trichloride trihydrate, .0021 mols triphenyl phosphine, .07 mols butadiene and .56 mols of water as well as .3 g. of sodium hexadecyl benzene sulfonate as an emulsifying agent. Table I below shows the effect of polymerization both in the absence and in the presence of varying amounts of hypophosphorous acid. All polymerizations were conducted at 50° C. after thorough degassing.

TABLE I

[Effect of hypophosphorous acid on $RuCl_2/\varphi_3P$ catalyst complex]

| Exp. No. | Cat./Monomer Mol Ratio $Ru^{+++}/\varphi_3P/BD$ | Polym. Time, hrs. | Temp., C. | Conversion, Percent | Structure | | |
|---|---|---|---|---|---|---|---|
| | | | | | Cis | Trans | 1, 2 |
| A | 1/6/200 | 25 | 50 | 10–30 | 57 | 23 | 20 |
| B₁ | 1/6/200 | 25 | 50 | 10–30 | 60 | 22 | 18 |
| B₂ | 1/6/200 | 25 | 50 | 10–30 | 61 | 21 | 18 |
| B₃ | 1/6/200 | 25 | 50 | 10–30 | 53 | 24 | 23 |
| B₄ | 1/6/200 | 25 | 50 | 10–30 | 57 | 23 | 20 |
| | $Ru^{+++}/\varphi_3P/H_3PO_2/BD$ | | | | | | |
| C | 1/6/0.1/200 | 6 | 50 | 46 | 59 | 22 | 19 |
| D | 1/6/0.5/200 | 6 | 50 | 71 | 60 | 22 | 18 |
| E | 1/6/1/200 | 6 | 50 | 48 | 56 | 23 | 21 |

B₁—N,N′-diphenyl p-phenylene diamine added.
B₂—N-phenyl-beta-naphthylamine added.
B₃—Bis(3,5-di-tert-butyl-4-hydrophenyl)methane added.
B₄—p-Benzoquinone added.

Table I shows that the presence of minor proportions of hypophosphorous acid caused a substantial reduction in polymerization time required to reach excellent conversion of monomer to polymer without deleteriously effecting the 1,4-isomer concentration in the polymer.

*Example II—Ruthenium tri-chloride hypophosphorus acid catalyst*

Comparative experiments were performed to determine whether or not hypophosphorous acid was itself a catalyst for the system in the absence of ruthenium trichloride-triphenyl phosphine complex. Table II below presents the results obtained. It will be seen that sample F, which contained no ruthenium compound resulted in no polymer being formed. Furthermore, experiments K and L demonstrate that while ruthenium trichloride may produce trace amounts only of an inpure, uncharacterizable material, by itself, it is a completely ineffective catalyst for polymerization. However, the ruthenium ion when used in conjunction with hypophosphorous acid produces a low molecular weight polymer of preponderantly trans-1,4 microstructure. This is shown by Examples G–J in Table II. The comparative experiments were performed for a polymerization time of 91 hours at 50° C., the samples containing mol ratios of the following: 20 butadiene, 160 water, 1 ruthenium, .01–.1 hypophosphorous acid and 0.3 g. sodium hexadecyl benzene sulfonate as an emulsifying agent.

being conducted in the further presence of 0.01–10 mol of hypophosphorous acid per mol of salt at a temperature of 0–150° C.

2. A process according to claim 1 wherein the catalyst is a complex of ruthenium chloride with a cyclic diene hydrocarbon, the mol ratio of chloride to cyclic hydrocarbon being between about 1:3 and 1:10, the polymerization temperature being between about 25° C. and 75° C.

3. The emulsion polymerization of butadiene according to claim 1, wherein the catalyst is a ruthenium chloride and the polymerization temperature is between about 25° C. and 75° C.

4. The emulsion polymerization of butadiene according to claim 7, wherein the polymerization temperature is between about 25° C. and 75° C., the catalyst being a complex of ruthenium chloride with a trihydrocarbyl phosphine wherein the mol ratio of chloride to phosphine is between about 1:1 and 1:10.

5. A process according to claim 4 wherein the catalyst

TABLE II
[Effect of hypophosphorous acid on $RuCl_3 \cdot 3H_2O$]

| Sample | Cat./Monomer Mol Ratio $Ru^{+++}/H_3PO_2/BD$ | Polym. Time, hrs. | Temp., °C. | Physical Description | Microstructure (Normalized-infrared film) | | |
|---|---|---|---|---|---|---|---|
| | | | | | Percent cis 1, 4 | trans 1, 4 | 1, 2 |
| G | 1/.01/20 | 91 | 50 | Polymer | | 84 | 16 |
| H | 1/.025/20 | 91 | 50 | ----do | | 86 | 14 |
| I | 1/.05/20 | 91 | 50 | ----do | | 88 | 12 |
| J | 1/.1/20 | 91 | 50 | ----do | | 85 | 15 |
| | $RuCl_3 \cdot 3H_2O$/BD | | | | | | |
| K | 1/90 | 188 | 25 | } Polybutadiene was not formed. | | | |
| L | 1/20 | 18 | 50 | | | | |
| | $H_3PO_2$/BD | | | | | | |
| F | 0.1/20 | 19 | 50 | Do. | | | |

I claim as my invention:

1. The process for the polymerization of butadiene in an aqueous medium which comprises conducting the polymerization in the presence of a catalyst of the group consisting of ruthenium salts of mineral acids and their complexes with compound of the group consisting of cyclic diene hydrocarbons, trihydrocarbyl phosphines, trihydrocarbyl arsines, and trihydrocarbyl stibines, the complexes containing a mol ratio of salt to complexing compound between about 1:1 and 1:10, the polymerization is a complex of one mol of ruthenium trichloride and 3–10 mols of triphenyl phosphine.

6. A process according to claim 4 wherein the catalyst is a complex of a ruthenium chloride with tributyl phosphine.

References Cited by the Examiner
UNITED STATES PATENTS
2,451,180  10/48  Stewart _____ 260—94.3

JOSEPH L. SCHOFER, *Primary Examiner.*